Jan. 12, 1943.  W. S. BOWEN  2,308,353
FLOCCULATOR HEAD
Filed April 22, 1941
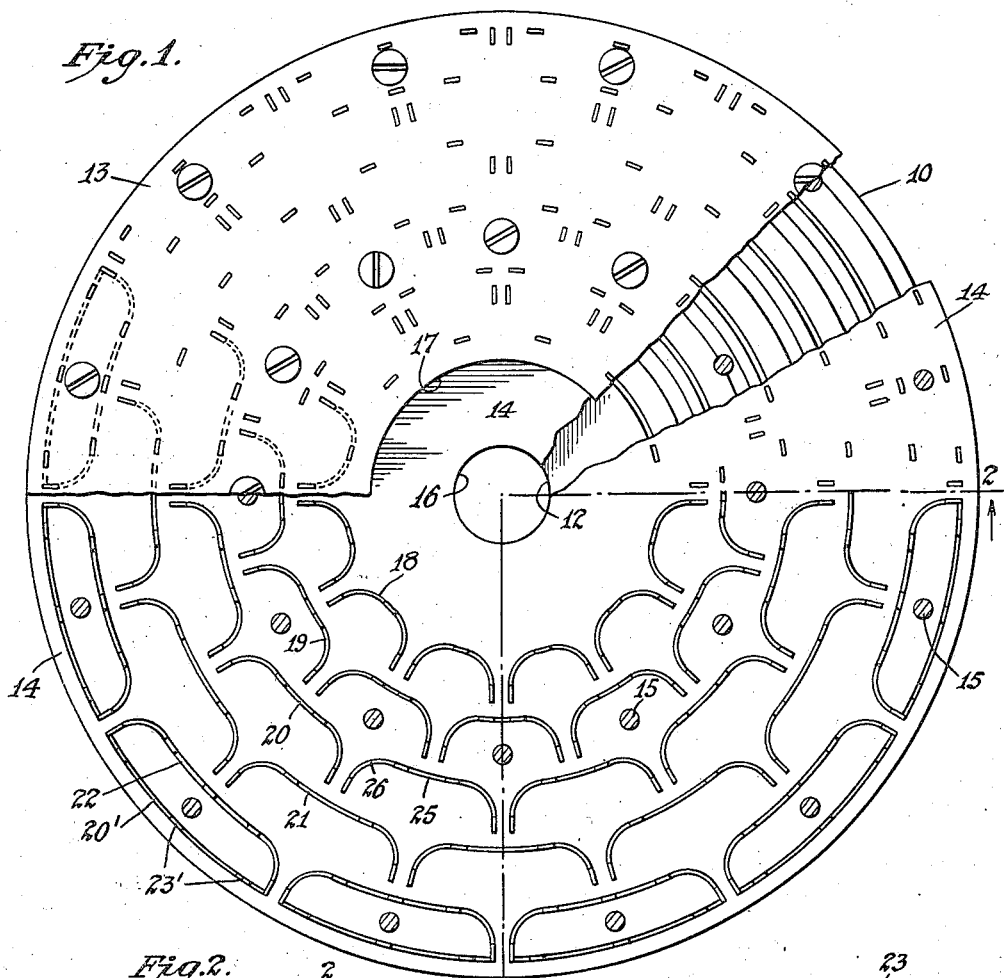
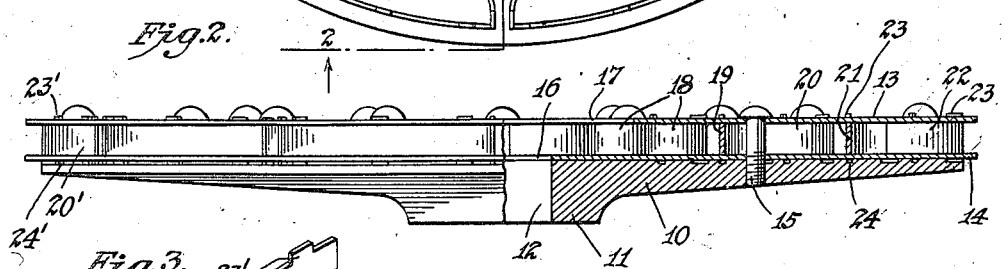
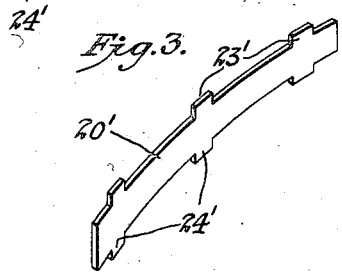
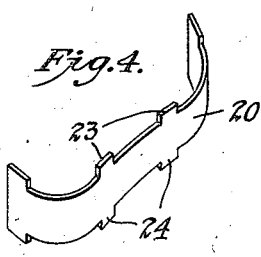
INVENTOR
WILLIAM SPENCER BOWEN
BY
ATTORNEYS Patented Jan. 12, 1943

2,308,353

UNITED STATES PATENT OFFICE 2,308,353

FLOCCULATOR HEAD

William Spencer Bowen, Westfield, N. J.

Application April 22, 1941, Serial No. 389,757

9 Claims. (Cl. 31—34)

The present invention relates to devices for flocculating substances of various types, and embodies, more specifically, an improved form of rotary head by means of which flocculation may be carried out more effectively.

In existing forms of spray heads, it is common practice to subject the material being sprayed to impact and shearing stresses to accomplish homogenization of the material, the stresses being secured by means of rotary heads into the axial portion of which the material is fed in order that it may be directed outwardly through the head under centrifugal force. In certain operations, for example, flocculating operations such as the churning of milk and cream to produce butter, in which particles are caused to form agglomerates, as distinguished from homogenizing by subdividing and dispersing the particles, the spray heads now available have not proved to be entirely satisfactory. I have found that these prior devices are capable only of converting 96% of the butter fat content of milk into butter, the remainder of the fat going over into the butter milk. Similar action occurs in other mixtures in which ingredients are to be flocculated.

I have discovered that I am able to secure more effective flocculation if the material is subjected only to impact forces and not to shearing stresses which occur in existing mechanisms. Accordingly, an object of the present invention is to provide a flocculating mechanism by means of which flocculating operations may be carried out more effectively than in existing mechanisms.

A further object of the above invention is to provide a mechanism wherein the forces to which the material is subjected during flocculation are primarily those of impact.

A further object of the above invention is to provide a device of the above character wherein shearing forces are substantially eliminated from the material during flocculation.

The foregoing objects are attained by utilizing a rotary mechanism wherein means is provided for directing the material along paths having no sharp corners and in which the material is repeatedly subjected to impact forces.

Further objects will be readily apparent to those skilled in the art, and the invention will now be described with specific reference to the accompanying drawing, wherein:

Fig. 1 is a plan view, partly broken away and in section, showing a flocculator mechanism constructed in accordance with the present invention.

Fig. 2 is a view in side elevation, partly broken away and in section, taken on the line 2—2 of Fig. 1 and looking in the direction of the arrows.

Fig. 3 is a perspective view of a shroud member for the outer vane elements of the flocculator mechanism shown in Fig. 1.

Fig. 4 is a perspective view of a vane element of the flocculator mechanism shown in Fig. 1.

Referring now more specifically to the above drawing, the flocculator will be seen to include the body portion 10 having a hub 11 formed with an axial hollow portion 12 by means of which the mechanism may be mounted upon any suitable driving shaft.

The head is preferably formed with top and bottom plates 13 and 14, respectively, which are adapted to be secured to the head 10 by means of bolts 15. The bottom plate 14 is formed with an axial hollow portion 16 that is preferably of the same dimension as the hollow portion 12 of the head 10, while the top plate 13 is formed with an enlarged hollow portion 17 to provide adequate space through which material to be flocculated may be fed into the device.

Between the top and bottom plates 13 and 14, there is provided a plurality of vanes arranged in concentric and circumferential rows. For example, vanes 18 form the inner circumferential row, whereas vanes 19 form a concentric row adjacent the inner vanes 18 and so disposed that the centers of the vanes 19 lie radially outwardly of the adjacent ends of the vanes 18. This will result in the material's being directed outwardly between the respective vanes 18 and striking the centers of the vanes 19.

The next outer row of vanes 20 is likewise staggered with respect to the vanes 19, thus having their centers radially aligned with vanes 18. The material flowing around the vanes 19 will thus be directed against the centers of the vanes 20 and subjected to further impact stresses. In the device illustrated in the drawing, additional circumferential rows of vanes 21 and 22 are provided in the same manner as described in connection with vanes 18, 19 and 20. The outer vanes 22 are formed with peripheral shroud members 20' to streamline the mechanism. These members are formed with top and bottom lugs 23' and 24' to secure them in a position and manner which will be readily apparent.

It will be observed that, as the position of the vanes varies outwardly in a radial direction, they are formed longer so that the vanes 22 are longer in a circumferential direction than vanes 21, vanes 21 are longer in a circumferential direction than vanes 20, vanes 20 are longer than vanes 19 and vanes 19 are longer than vanes 18.

As illustrated in Figure 4, the vanes are provided with a plurality of top lugs 23 and bottom lugs 24. The number of such lugs depends upon the length of the vane, the strength and the forces to which it is subjected. For example, vanes 18 are formed with three lugs. These vanes are mounted in the position shown in Fig. 1 so that the centers of the vanes are securely fixed in position between the top and bottom plates as well as the ends thereof. This results in effectively maintaining the vanes in the desired relationship. Vanes 19, 20 and 21 are illustrated in Fig. 4, wherein, because of the lengths of these vanes, four lugs are provided at the tops and bottoms of each vane. Each of the vanes 22 is provided with five lugs because of the increased length of these vanes over the vanes previously referred to. The top and bottom plates 13 and 14 are formed with apertures to receive the lugs when the vanes are properly formed and the entire assembly may either be maintained in position by the proper number of bolts 15 or the mechanism may be assembled in any other manner such as by welding, etc. It will also be apparent that the bottom plate 14 may be omitted if desired, and the vanes secured directly to the head 10 although I prefer the structure shown in the drawing because it provides a mechanism that may be readily disassembled, repaired and in which worn and defective parts may be replaced with a minimum of effort.

It will also be observed that the centers of the vanes, indicated generally at 25, are formed with a curvature appropriate to the radius from the center of the head to the central portion of the vane. This provides an effective impact surface against which the material is directed with the full force available, thus improving the flocculation. The curved portions 26 of the vanes provide easy paths along which the material moves between successive impacts and without being subjected to any shearing stresses that might disrupt the flocculation accomplished by impact.

While the invention has been described with reference to the specific structure shown in the accompanying drawing, it is not to be limited save as defined in the appended claims.

I claim:

1. A flocculator mechanism comprising a rotatable body having a horizontal surface, a top plate spaced from said surface, and a plurality of spaced apart vanes secured between the top plate and surface, some of said vanes being disposed radially outward of and in staggered relationship to other vanes, said vanes being formed with nonangular surfaces to be engaged by the substance to be flocculated.

2. A flocculator mechanism comprising a rotatable body having a horizontal surface, a top plate spaced from said surface, and a plurality of spaced apart vanes secured between the top plate and surface, some of said vanes being disposed radially outward of and in staggered relationship to other vanes, said vanes being formed with curved ends.

3. A flocculator mechanism comprising a rotatable body having a horizontal surface, a top plate spaced from said surface, and a plurality of vanes secured between the top plate and surface in staggered relationship, said vanes being formed with ends curved radially outwardly and ending adjacent the mid-section of vanes radially remote therefrom.

4. A flocculator mechanism comprising a rotatable body having a horizontal surface, a top plate spaced from said surface and a plurality of annular concentric rows of vanes with their centers in staggered relationship, said vanes being formed with outwardly curving ends.

5. A flocculator mechanism comprising a rotatable body having a horizontal surface, a top plate spaced from said surface and a plurality of annular concentric rows of vanes with their centers in staggered relationship, said vanes being formed with outwardly curving ends and so positioned that adjacent ends of adjacent vanes in one row lie in substantially the radial planes passing through the centers of vanes in the adjacent outer annular row.

6. A flocculator mechanism comprising a rotatable body having a horizontal surface, a top plate spaced from said surface and a plurality of annular concentric rows of vanes with their centers in staggered relationship, said vanes being formed with outwardly curving ends and so positioned that adjacent ends of adjacent vanes in one row lie in substantially the radial planes passing through the centers of vanes in the adjacent outer annular row and certain of said vanes having surfaces curved about the radius of the body.

7. A flocculator having a rotatable body formed with a horizontal surface, top and bottom plates, means to secure the top and bottom plates to the top surface, and vanes between the plates formed with ends curved outwardly and positioned with their centers in different radial planes.

8. A flocculator having a rotatable body formed with a horizontal surface, top and bottom plates, means to secure the top and bottom plates to the top surface, and vanes between the plates formed with ends curved outwardly and positioned with their centers in different radial planes and at different radial distances from the center of the body.

9. A flocculator having a rotatable body formed with a horizontal surface, top and bottom plates, means to secure the top and bottom plates to the top surface, and vanes between the plates formed with ends curved outwardly and positioned with their centers in different radial planes and at different radial distances from the center of the body, the central portions of certain of the vanes being curved about the axis of the body.

WILLIAM SPENCER BOWEN.